United States Patent
Vollenberg et al.

(10) Patent No.: US 9,546,269 B2
(45) Date of Patent: Jan. 17, 2017

(54) TRANSPARENT PLASTIC ARTICLE

(71) Applicant: SABIC Innovative Plastics IP B.V., Bergen op Zoom (NL)

(72) Inventors: Peter Hendrikus Theodorus Vollenberg, Evansville, IN (US); Christopher Luke Hein, Evansville, IN (US); Derek Lake, Evansville, IN (US); Daniel Francis Lowery, Mt. Vernon, IN (US); Jon M. Malinoski, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 33 days.

(21) Appl. No.: 14/423,430

(22) PCT Filed: Aug. 21, 2013

(86) PCT No.: PCT/US2013/055959
§ 371 (c)(1),
(2) Date: Feb. 23, 2015

(87) PCT Pub. No.: WO2014/031730
PCT Pub. Date: Feb. 27, 2014

(65) Prior Publication Data
US 2015/0299460 A1    Oct. 22, 2015

Related U.S. Application Data

(60) Provisional application No. 61/691,579, filed on Aug. 21, 2012.

(51) Int. Cl.
*C08L 69/00* (2006.01)
*C08K 3/00* (2006.01)
*C08K 3/32* (2006.01)
*C08K 3/24* (2006.01)

(52) U.S. Cl.
CPC .............. *C08L 69/00* (2013.01); *C08K 3/0033* (2013.01); *C08K 3/24* (2013.01); *C08K 3/32* (2013.01); *C08L 2205/02* (2013.01); *C08L 2205/06* (2013.01)

(58) Field of Classification Search
None
See application file for complete search history.

(56) References Cited

U.S. PATENT DOCUMENTS

| | | |
|---|---|---|
| 2003/0032725 A1 | 2/2003 | Gaggar et al. |
| 2009/0054586 A1 | 2/2009 | Hein et al. |
| 2011/0151262 A1 | 6/2011 | Heuer et al. |

FOREIGN PATENT DOCUMENTS

| | | |
|---|---|---|
| EP | 2338880 A2 | 6/2011 |
| WO | 2009045791 A1 | 4/2009 |
| WO | WO2009045791 A1 * | 4/2009 |

OTHER PUBLICATIONS

Written Opinion of the International Searching Authority/International Search Report for International Application No. PCT/US2013/055959; International Filing Date Aug. 21, 2013; mailed Nov. 6, 2013; 5 pgs.

* cited by examiner

*Primary Examiner* — Tahseen N Khan
(74) *Attorney, Agent, or Firm* — Cantor Colburn LLP

(57) ABSTRACT

A plastic article is described having a thickness of 0.5 mm to 5 mm, comprising a polycarbonate thermoplastic composition including polycarbonates containing phthalimidine carbonate units, said composition providing a heat deflection temperature of at least 145° C., a light transmittance of at least 85%, and CIE 1976 L*, a*, b* values of L* greater than 92, a* between −1.5 and 1.5, and b* between −2.0 and 3.0, when tested in the form of a 3.2 mm thick test sample molded at 580° F. (304° C.) with a 1.7 minute residence time, using CIE illuminant C and 2 degree observer.

20 Claims, No Drawings

TRANSPARENT PLASTIC ARTICLE

CROSS REFERENCE TO RELATED APPLICATION

This patent application is a national stage of PCT Application Serial No. PCT/US2013/055959, filed Aug. 21, 2013, which claims priority to U.S. Provisional Patent Application Ser. No. 61/691,579, filed Aug. 21, 2012, both of which are incorporated herein by reference in their entirety.

BACKGROUND OF THE INVENTION

This disclosure relates to thermoplastic articles, and in particular to transparent articles based on polycarbonate compositions that can withstand demanding processing conditions and perform in high-temperature environments.

Polycarbonates can be used in the manufacture of articles and components for a wide range of applications, from automotive parts to electronic appliances. Because of their beneficial properties such as transparency and impact resistance, polycarbonates have been widely used in applications such as instrument screens, helmet face shields, eyeglass and safety glass lenses, and illumination lenses such as light fixtures, flashlight and lantern lenses, and motor vehicle headlight lenses and covers. In some applications including but not limited to motor vehicle headlight lenses and covers, other performance properties may also be desirable such as transparency, low color, ability to withstand elevated temperatures without deformation or discoloration, and/or ability to maintain these properties even when molded under adverse conditions. Although many polycarbonate compositions can provide some of the aforementioned properties, many known compositions have not been able to achieve desired levels in multiple performance categories. There accordingly remains a need in the art for plastic articles that provide beneficial combinations of properties such as high transparency, and heat deformation resistance, and impact strength for molding under adverse conditions and performance in demanding environments.

SUMMARY OF THE INVENTION

In an embodiment, the above-described and other deficiencies of the art are addressed by a plastic article having a thickness of 0.5 to 5 mm, formed from a thermoplastic composition that comprises:

1 mole % to 50 mole % of carbonate units represented by the formula (I)

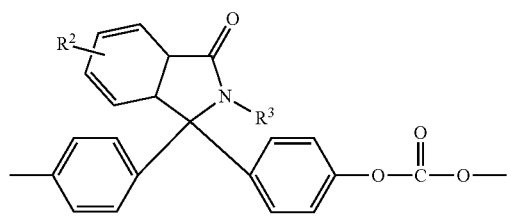

wherein $R^2$ is hydrogen, a $C_{1-25}$ hydrocarbyl group, or halogen, and $R^3$ hydrogen or a $C_{1-25}$ hydrocarbyl group;

50 mole % to 99 mole % of carbonate units represented by the formula (II)

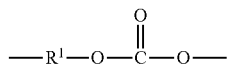

in which at least 60 percent of the total number of $R^1$ groups contain aromatic moieties and the balance thereof are aliphatic, alicyclic, or aromatic moieties, with the proviso that the carbonate units of formula (II) are not within the scope of formula (I), the mole percentages of formulas (I) and (II) based on the total number of carbonate units in the thermoplastic composition; and from 0.1 to 10 parts per million (ppm) by weight of an acid additive;

wherein the thermoplastic composition has:

a heat deflection temperature (HDT) of at least 145° C. when tested in the form of a 3.2 mm thick test sample according to ASTM D648-06 under a load of 0.45 MegaPascals (MPa);

a light transmittance of at least 85% when tested in the form of a 3.2 mm thick test sample according to ASTM D1003-00 using procedure A and CIE illuminant C and 2 degree observer on a CE7000A using an integrating sphere with 8°/diffuse geometry, specular component included, UV included, large lens, and large area view, with the percent transmittance value reported as Y (luminous transmittance) taken from the CIE 1931 tristimulus values XYZ; and CIE 1976 L*, a*, b* values determined according to ASTM E308-08 of L* greater than 92, a* between −1.5 and 1.5, and b* between −2.0 and 3.0, when tested in the form of a 3.2 mm thick test sample molded at 580° F. (304° C.) with a 1.7 minute residence time, using CIE illuminant C and 2 degree observer.

DETAILED DESCRIPTION OF THE INVENTION

Surprisingly, it has been discovered that the above-described article having a thickness of 0.5 mm to 5 mm and formed from a thermoplastic polycarbonate composition comprising 1-50 mole % of units of formula (I) and 50-99 mole % of units of formula (II), and 0.1-10 ppm by weight of phosphorous acid, can provide beneficial stable properties such as high light transmittance, targeted color balance, and impact strength.

As used herein, a "polycarbonate" means compositions having repeating structural carbonate units of formula (1)

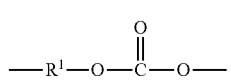

in which at least 60 percent of the total number of $R^1$ groups contain aromatic moieties and the balance thereof are aliphatic, alicyclic, or aromatic. Also, carbonate units of formula (II) described above are carbonate units according to formula (1), subject to the proviso that the carbonate units of formula (II) are not within the scope of formula (I). With respect to formula (1), in an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2)

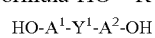

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a dihydroxy aromatic compound of formula (3)

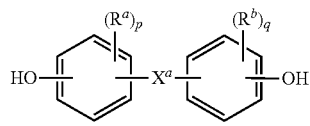

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, $X^a$ is a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

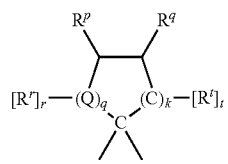

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols where $X^a$ is of formula (4) can be used in the manufacture of polycarbonates containing phthalimidine carbonate units of formula (II)

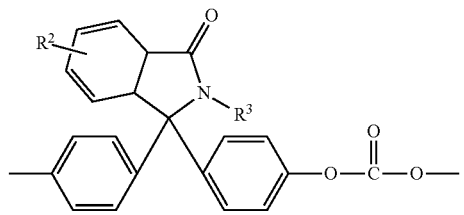

wherein $R^2$ is hydrogen, a $C_{1-25}$ hydrocarbyl group, or halogen, and $R^3$ is hydrogen or a $C_{1-25}$ hydrocarbyl group $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. More specifically, $R^2$ can be hydrogen and $R^3$ can be a $C_{6-10}$ aromatic group such as phenyl or substituted phenyl, In some embodiments, the phthalimidine carbonate units can be of formula (4b)

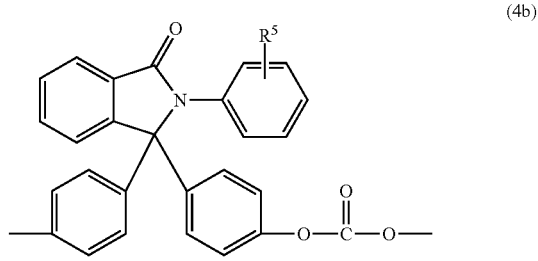

(4b)

wherein $R^5$ is hydrogen or a $C_{1-6}$ alkyl, more specifically hydrogen. Such carbonate units wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units where $X^a$ is according to formula (4) are the isatin-derived carbonate units of formula (4c) and (4d)

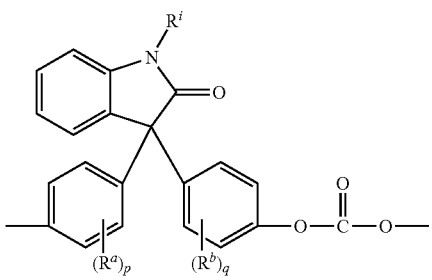

(4c)

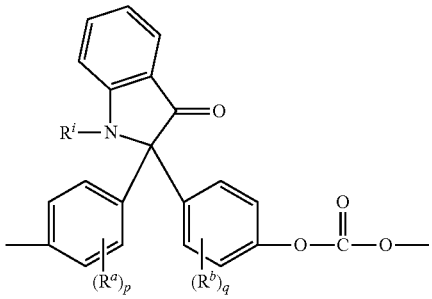

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units derived from bisphenols (4) wherein $X^a$ is a substituted or unsubstituted $C_{3-18}$ cycloalkylidene include the cyclohexylidene-bridged, alkyl-substituted bisphenol of formula (4e)

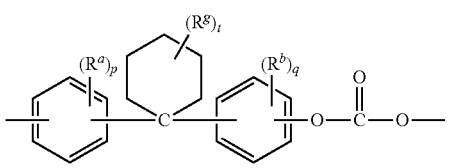

(4e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, r and s are each 0 or 1, and t is 0 or 3, specifically 0. For example, Examples of other bisphenol carbonate units derived from bisphenol (4) wherein $X^a$ is a substituted or unsubstituted $C_{3-18}$ cycloalkylidene include units (4f) (also known as adamantyl units) and units (4g)

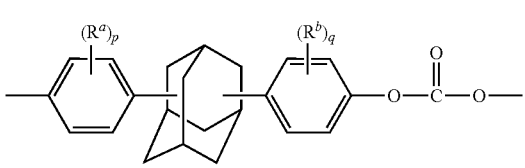

(4f)

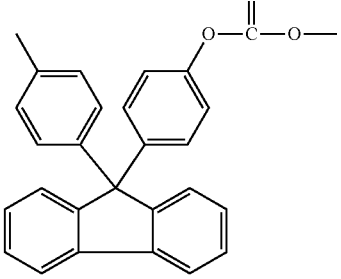

(4g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4) to (4g) can be used for making polycarbonates with high glass transition temperatures (Tg) and high heat distortion temperatures.

Other aromatic dihydroxy compounds of the formula HO—$R^1$—OH include compounds of formula (6)

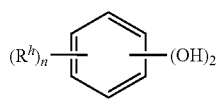

(6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4- hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxy-dibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis (4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

In an embodiment, the polycarbonate has flow properties for the manufacture of thin articles. Melt flow rate (often abbreviated MFR) measures the rate of extrusion of a thermoplastic through an orifice at a prescribed temperature and load, and can be determined according to ASTM D1238-04C. Polycarbonates for the formation of thin articles can have an MFR, measured at 330° C./2.16 kg, of 10 to 90 grams per 10 minutes (g/10 min), specifically 20 to 40 g/10 min. Combinations of polycarbonates of different flow properties can be used to achieve the overall desired flow property.

"Polycarbonates" includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

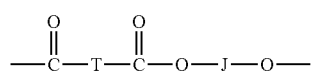
(7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear. In another embodiment, J is a $C_{2-30}$ alkylene group having a straight chain, branched chain, or cyclic (including polycyclic) structure. J can be derived from an aromatic dihydroxy compound of formula (3) above, or from an aromatic dihydroxy compound of formula (4) above, or from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In an embodiment, the polyester unit of a polyester-polycarbonate is derived from the reaction of a combination of isophthalic and terephthalic diacids (or derivatives thereof) with resorcinol. In another embodiment, the polyester unit of a polyester-polycarbonate is derived from the reaction of a combination of isophthalic acid and terephthalic acid with bisphenol A. In another embodiment, the polycarbonate units are derived from bisphenol A. In another embodiment, the polycarbonate units are derived from resorcinol and bisphenol A in a molar ratio of resorcinol carbonate units to bisphenol A carbonate units of 1:99 to 99:1.

Polycarbonates can be manufactured by processes such as interfacial polymerization and melt polymerization. Although the reaction conditions for interfacial polymerization can vary, an process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. Phosgene can also be a carbonate precursor in, an interfacial polymerization reaction to form carbonate linkages, which is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. A phase transfer catalyst can be used in an amount of 0.1 to 10 wt %, more specifically from 0.5 to 2 wt %, based on the weight of bisphenol in the phosgenation mixture.

All types of polycarbonate end groups are contemplated for the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt %, based on the total weight of dihydroxy compound in the polymerization reaction mixture. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are exemplary. Other examples include functionalized chlorides of aliphatic monocarboxylic acids, such as acryloyl chloride and methacryoyl chloride, mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury* mixer, twin screw extruder, or the like to form a uniform dispersion. Volatile monohydric phenol is removed from the molten reactants by distillation and the polymer is isolated as a molten residue. A specific melt process for making polycarbonates uses a diaryl carbonate ester having electron-withdrawing substituents on the aryls. Examples of specific diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis (4-methylcarboxylphenyl) carbonate, bis(2-acetylphenyl) carboxylate, bis(4-acetylphenyl) carboxylate, or a combination comprising at least one of the foregoing esters. In addition, transesterification catalysts can include phase transfer catalysts of formula $(R^3)_4Q^+X$, wherein each $R^3$, Q, and X are as defined above. transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

In addition to the polycarbonates described above, combinations of the polycarbonate with other thermoplastic polymers, for example combinations of homopolycarbonates and/or polycarbonate copolymers with polyesters, can be used. Polyesters can have repeating units of formula (7), which include poly(alkylene dicarboxylates), liquid crystalline polyesters, and polyester copolymers. The polyesters described herein are generally completely miscible with the polycarbonates when blended.

Polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Polyesters can include aromatic polyesters, poly(alkylene esters) including poly(alkylene arylates), and poly(cycloalkylene diesters). Aromatic polyesters can have a polyester structure according to formula (7), wherein J and T are each aromatic groups as described hereinabove. Aromatic polyesters can include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)] ester, or a combination comprising at least one of these. Also contemplated are aromatic polyesters with a minor amount, e.g., 0.5 to 10 weight percent, based on the total weight of the polyester, of units derived from an aliphatic diacid and/or an aliphatic polyol to make copolyesters. Poly(alkylene arylates) can have a polyester structure according to formula (7), wherein T comprises groups derived from aromatic dicarboxylates, cycloaliphatic dicarboxylic acids, or derivatives thereof. Examples of T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specific alkylene groups J include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Other examples include poly(alkylene naphthoates), such as poly(ethylene naphthanoate) (PEN), and poly(butylene naphthanoate) (PBN). A specific poly(cycloalkylene diester) is poly(cyclohexanedimethylene terephthalate) (PCT). Combinations comprising at least one of the foregoing polyesters are also contemplated.

Copolymers comprising alkylene terephthalate repeating ester units with other ester groups can also be used. Specific ester units can include different alkylene terephthalate units, which can be present in the polymer chain as individual units, or as blocks of poly(alkylene terephthalates). copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (9)

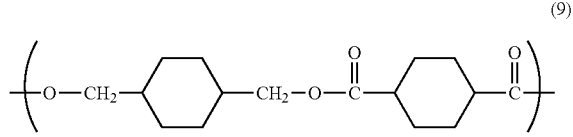

(9)

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

Another type of polycarbonate copolymer is a polysiloxane-polycarbonate copolymer having polydiorganosiloxane blocks comprise repeating structural units of formula (9):

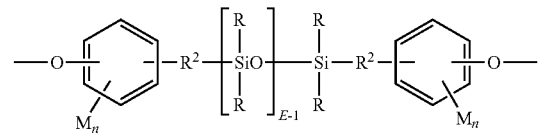

(10)

wherein each R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations of the foregoing R groups can be used in the same copolymer. $R^2$ in formula (10) is a divalent $C_1$-$C_8$ aliphatic group. Each M in formula (10) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4. Although a polysiloxane-polycarbonate copolymer can be included in the composition in some embodiments, it should be noted that inclusion of a polysiloxane-polycarbonate copolymer can have an adverse impact on the transparency of the article, and therefore the thermoplastic composition can be free of polysiloxane-polycarbonate copolymer.

E in formula (10) is selected so as to provide a desired level of properties such as flame retardance to the thermoplastic composition. The value of E will therefore vary depending on the type and relative amount of each component in the thermoplastic composition. Values for E can be determined by one of ordinary skill in the art without undue experimentation using the guidelines taught herein. Generally, E has an average value of 2 to 1,000, specifically 10 to 100, more specifically 25 to 75. In an embodiment, E has an average value of 40 to 60, and in still another embodiment, E has an average value of 50. Where E is of a lower value, e.g., less than 40, it can be necessary to use a relatively larger amount of the polysiloxane-polycarbonate copolymer. Conversely, where E is of a higher value, e.g., greater than or equal to 40, it can be necessary to use a relatively smaller amount of the polysiloxane-polycarbonate copolymer.

In an embodiment, M is independently bromo or chloro, a $C_1$-$C_3$ alkyl group such as methyl, ethyl, or propyl, a $C_1$-$C_3$ alkoxy group such as methoxy, ethoxy, or propoxy, or a $C_6$-$C_7$ aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

The polysiloxane-polycarbonate copolymer can be manufactured by reaction of the corresponding dihydroxy polysiloxane with a carbonate source and a dihydroxy aromatic compound of formula (3), optionally in the presence of a phase transfer catalyst as described above. Conditions are similar to those used in forming polycarbonates. Alternatively, the polysiloxane-polycarbonate copolymers can be prepared by co-reacting in a molten state, the dihydroxy monomers and a diaryl carbonate ester, such as diphenyl carbonate, in the presence of a transesterification catalyst as described above. Generally, the amount of dihydroxy polydiorganosiloxane is selected so as to produce a copolymer comprising 1 to 60 mole percent of polydiorganosiloxane blocks, and more generally, 3 to 50 mole percent of polydiorganosiloxane blocks. When present, the polysiloxane-polycarbonate copolymer can be used in amounts of 5 to 50 parts by weight (pbw), more specifically 10 to 40 parts by weight, based on 100 parts by weight of the total parts of resin and impact modifier in the thermoplastic composition.

In addition to the above-described components, the thermoplastic composition can include various additives ordinarily incorporated into polymer compositions of this type, with the proviso that the additive(s) are selected so as to not significantly adversely affect the desired properties of the thermoplastic composition, in particular the above-described light transmittance, color properties, HDT, and impact resistance properties. Such additives can be mixed at an appropriate time during the mixing of the components for forming the composition. Additives include impact modifiers, reinforcing agents, antioxidants, heat stabilizers, light stabilizers (including ultraviolet (UV) light stabilizers), plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, as is known in the art. In general, the additives are used in the amounts generally known to be effective. The total amount of additives is generally 0.01 to 5 weight percent (wt. %), based on the total weight of the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or combinations comprising at least one of the foregoing light stabilizers. Light stabilizers are used in amounts of 0.01 to 5 parts by weight, based on 100 parts by weight of the thermoplastic composition, excluding any filler.

UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene) bis(4H-3,1-benzoxazin-4-one) (CYASORB* UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis[(2-cyano-3,3-diphenylacryloyl)oxy]-2,2-bis [[(2-cyano-3,3-diphenylacryloyl)oxy]methyl]propane; phenol, 2-(2H-benzotriazol-2-yl)-4,6-bis(1-methyl-1-phenylethyl)-(TINUVIN* 234); BCAP bismalonate from Clariant; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 parts by weight, based on 100 parts by weight of the total composition, excluding any filler.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition.

Colorants can be added to the thermoplastic composition to achieve specifically targeted color space values within the limits specified hereinabove. Colorants include, for example, anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxaxolylthiophenes (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants. The amount of colorant depends on the target color properties for the article, the spectral absorbance properties of the colorant(s), and the intrinsic color properties of the polycarbonate and any other materials or additives in the thermoplastic composition. The amount can vary, provided that it is kept below the level at which transmittance of the article would fall below the 85% level disclosed herein. Exemplary amounts can range from 0.00005 to 0.01 parts by weight per 100 parts by weight of polycarbonate resin and any impact modifier.

Specific exemplary colorants include organic dyes such as coumarin 460 (blue), coumarin 6 (green), nile red or the like; lanthanide complexes; hydrocarbon and substituted hydrocarbon dyes; polycyclic aromatic hyrdocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as antistokes shift dyes which absorb in the near infrared wavelength and emit in the visible wavelength, or the like; luminescent dyes such as 5-amino-9-diethyliminobenzo(a) phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-Ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3',3',3'-hexamethylindotricarbocyanine iodide; 2-methyl-5-t-butyl-p-quaterphenyl; N-methyl-4-trifluoromethylpiperidino-<3,2-g>coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3"",5""-tetra-t-butyl-p-sexiphenyl; 3,5,3"",5""-tetra-t-butyl-p-quinquephenyl; 2,3,5,6-1H,4H-tetrahydro-9-acetylquinolizino-<9,9a,1-gh>coumarin; 2,3,5,6-1H,4H-tetrahydro-9-carboethoxyquinolizino-<9,9a,1-gh>coumarin; 2,3,5,6-1H,4H-tetrahydro-8-methylquinolizino-<9,9a, 1-gh>coumarin; 2,3,5,6-1H,4H-tetrahydro-9-(3-pyridyl)-quinolizino-<9,9a,1-gh>coumarin; 2,3,5,6-1H,4H-tetrahydro-8-trifluoromethylquinolizino-<9, 9a,1-gh>coumarin; 2,3,5,6-1H,4H-tetrahydroquinolizino-<9,9a,1-gh>coumarin; 3,3',2",3""-tetramethyl-p-quaterphenyl; 2,5,2"",5"-tetramethyl-p-quinquephenyl; P-terphenyl; P-quaterphenyl; nile red; rhodamine 700; oxazine 750; rhodamine 800; IR 125; IR 144; IR 140; IR 132; IR 26; IRS; diphenylhexatriene; diphenylbutadiene; tetraphenylbutadiene; naphthalene; anthracene; 9,10-diphenylanthracene; pyrene; chrysene; rubrene; coronene; phenanthrene or the like, 3-hydroxyflavones such as disclosed in US 2009/0054586 A1, or combinations comprising at least one of the foregoing dyes.

The thermoplastic composition disclosed herein can include flame retardants in addition to the above-described perfluoroalkyl sulfonate salt and cyclic siloxane compound. Notwithstanding that, in some exemplary embodiments described herein, such additional flame retardants are not needed. Therefore, in an exemplary embodiment the flame retardant additives used in the thermoplastic composition consist essentially of the perfluoroalkyl sulfonate salt and cyclic siloxane compound. In another exemplary embodiment, the flame retardant additives used in the thermoplastic composition consist of the perfluoroalkyl sulfonate salt and cyclic siloxane compound. If additional flame retardants are used, possible candidates include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Other flame retardants include di- or polyfunctional aromatic phosphorus-containing compounds, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition, excluding any filler.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition, excluding any filler.

Alternatively, the thermoplastic composition can be essentially free of chlorine and bromine. "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition, excluding any filler.

Salt-based flame retardants in addition to the perfluoroalkyl sulfonate salt can also be used, for example salts of $C_{1-16}$ alkyl sulfonate salts such as potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KalF_4$, $K_2SiF_6$, and/or $Na_3AlF_6$. When present, flame retardant salts are present in amounts of 0.01 to 10 parts by weight, more specifically 0.02 to 1 parts by weight, based on 100 parts by weight of the total composition, excluding any filler.

As described above, the thermoplastic composition comprises 1-50 mole % of carbonate units according to formula (I) and 50-99 mole % of carbonate units according to formula (II), based on the total number of carbonate units in the thermoplastic composition. In more specific embodiments, the thermoplastic composition comprises 10-50 mole % of carbonate units according to formula (I) and 50-90 mole % of carbonate units according to formula (II), and even more specifically 20-45 mole % of carbonate units according to formula (I) and 55-80 mole % of carbonate units according to formula (II). The specified carbonate unit content for the thermoplastic composition can be provided by any combination of homopolycarbonate(s) based on units of formula (I), co-polycarbonates containing units of formula (I) and carbonate units of formula (II), co-polymers containing units of formula (I) and other copolymerizable units such as ester units, and/or homopolycarbonates, co-polycarbonates or other co-polymers containing carbonate units of formula (II) but not formula (I). Although the thermoplastic composition's specified carbonate content of formula (I) and formula (II) carbonate units can be provided by a single co-polycarbonate containing units of formulas (I) and (II), blends of polycarbonates are often used to achieve desired performance properties such as MFR, glass transition temperature, etc. Accordingly, in some embodiments, the specified carbonate unit content is provided by a blend of a first polycarbonate comprising units of formula (I) (which can also contain carbonate units of formula (II)) and a second polycarbonate comprising units of formula (II). The first and second polycarbonates can be blended by melt blending techniques well-known in the art. In some embodiments, the first polycarbonate comprises 10-70 mole % of units of formula (I), more specifically from 20-45 mole % of units of formula (I), based on the total number of carbonate units in the first polymer, with the balance of carbonate units in the first polycarbonate chosen according to formula (II). The first polycarbonate can be present in the thermoplastic composition in amounts of 5 wt. % to 95 wt. %, more specifically from 10 wt. % to 50 wt. %, and even more specifically from 20 wt. % to 45 wt. %, based on the total weight of polycarbonate in the thermoplastic composition. The second polycarbonate can be present in the thermoplastic composition in amounts of 95 wt. % to 5 wt. %, more specifically from 50 wt. % to 90 wt. %, and even more specifically from 55 wt. % to 80 wt. %, based on the total weight of polycarbonate in the thermoplastic composition.

The first and second polymers can have an intrinsic viscosity, as determined in chloroform at 25° C., of 0.3 to 1.5 deciliters (dl) per gram (g), specifically 0.45 to 1.0 dl/g. The first and second polymers can have a molecular weight of 10,000 to 200,000 Daltons, specifically 20,000 to 100,000 Daltons. In some embodiments, the first polycarbonate can have a weight average molecular weight of 10,000 to 35,000, more specifically 20,000 to 30,000, and the second polycarbonate can have a weight average molecular weight of 18,000 to 32,000, more specifically 18,000 to 20,000, as determined by gel permeation chromatography using a crosslinked styrene-divinylbenzene column and calibrated to polycarbonate references.

The thermoplastic composition comprises an acid additive in an amount of 0.1 to 10 ppm by weight, specifically from 1 to 6 ppm by weight, and more specifically 3 to 5 ppm by weight. The acid additive can be any Arrhenius acid (i.e., protic acid), more specifically any acid with a pKa of less than or equal to about 5 (measured in water). In some embodiments, the acid is a stronger acid, i.e., an acid having a pKa (measured in water) of less or equal to about 2, specifically about 2 to about −1. In some embodiments, a weaker acid, i.e., having a pKa (measured in water) of greater than about 2, specifically greater than about 2 to about 4.5, has a stronger effect on both molding and heat aging. If a stronger acid is used, a lower amount may be used compared to if a weaker acid is used. In one embodiment, a stronger acid having a pKa of less than 2 is used; in other embodiments, a weaker acid having a pKa of greater than 2 is used. In some embodiments, an acid having a pKa of less than 4.5 is used. Acid stabilizers can include phosphoric acid, phosphorous acid, hypophosphorous acid, $C_{6-30}$ aryl, $C_{7-30}$ aralkyl or $C_{1-30}$ phosphonic acids, sulfurous acids, $C_{6-30}$ aryl, $C_{7-30}$ aralkyl or $C_{1-30}$ alkyl sulfonic acids, ammonium salts of sulfuric acids, halogenated carboxylic acids such as, for example, trifluoroacetic acid, trichloroacetic acid, and the like. In an exemplary embodiment, a weaker acid is phosphorous acid, and a stronger acid is p-toluenesulfonic acid. In some embodiments, the acid additive is a phosphorous-containing additive, more specifically phosphorous acid, hypophosphorous acid, or phosphoric acid, even more specifically phosphorous acid. Epoxy additives such as epoxy-modified acrylic oligomers or polymers can also be included as is known in the art; however, it has been discovered that for the thermoplastic compositions described herein, epoxy additives surprisingly can have a detrimental effect on molecular weight retention. Accordingly, in some embodiments the thermoplastic composition is free of epoxy additive.

The thermoplastic compositions can be manufactured by various methods. For example, powdered polycarbonate and phosphorous acid modifier, along with any impact modifier and/or other optional components are first blended, optionally with fillers in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Transparent compositions can be produced by manipulation of the process used to manufacture the polycarbonate composition. One example of such a process to produce transparent polycarbonate compositions is described in U.S. Patent Application No. 2003/0032725.

The thermoplastic composition can have flow properties for the manufacture of thin articles. Melt flow rate (often abbreviated MFR) measures the rate of extrusion of a thermoplastic through an orifice at a prescribed temperature and load. Thermoplastic compositions for the formation of thin articles can have an MFR, measured at 330° C./2.16 kg, of at least 12 grams per 10 minutes (g/10 min). In another exemplary embodiment, the MFR ranges from 10 to 20 g/10 min. Combinations of polycarbonates of different flow properties can be used to achieve the overall desired flow property.

The thermoplastic composition used to form the plastic article described herein has a heat deflection temperature (HDT) of at least 160° C., more specifically from 160° C. to 165° C., measured under a load of 0.45 MPa according to ASTM D648-06, with a test sample having a thickness of 3.2 mm.

The thermoplastic composition used to form the plastic article described herein can also have a Notched Izod Impact (NII) of at least 50 (Joules per meter) J/m, more specifically 50 J/m to 150 J/m, even more specifically from 80 J/m to 150 J/m, and even more specifically from 90 J/m to 120 J/m, determined according to ASTM D256-05 at 23° C. using a 2.27 kg weight with a test sample having a thickness of 3.2 mm.

The thermoplastic composition used to form the plastic article described herein has a light transmittance of at least 85%, more specifically at least 86%, and can be as high as 90%, when tested in the form of a 3.2 mm thick test sample molded at 580° F. (304° C.) with a 1.7 minute residence time according to ASTM D1003-00 using procedure A and CIE illuminant C.

Transparency can be characterized by transmittance and/or by haze levels, so the article can also have a haze of less than 4%, more specifically less than 2%, i.e., from 0% to 2%, wherein haze is measured on a CE7000A in accordance with ASTM D-1003-97, with a 3.2 mm thick test sample molded at 580° F. (304° C.) (barrel temperature) with a 1.7 minute residence time.

The thermoplastic composition used to form the plastic article described herein has CIE 1976 L*, a*, b* values determined according to ASTM E308-08. The CIE 1976 L* value is greater than 92, more specifically greater than 94, and can range as high as 98. The CIE 1976 a* value is between −1.5 and +1.5, more specifically between −0.72 and −0.12, and even more specifically between −0.70 and −0.20.

The CIE 1976 b* value is between −2.0 and 3.0, more specifically between 0.2 and 1.3, and even move specifically between 0.3 and 1.2, when tested in the form of a 3.2 mm thick test sample molded at 580° F. (304° C.) with a 1.7 minute residence time, using CIE illuminant C and 2 degree observer. Test samples can be molded from pellets that have been cooled and stored, followed by drying at an elevated temperature (e.g., 8 hours at 140° C.). For testing during commercial scale production, test samples can be molded from still-hot pellets taken directly from an extruder. In some cases, there may be some color variance between test samples molded from fresh hot pellets versus stored pellets that have been heat-dried; however, it is within the skill of the art to make adjustments to the formulation (e.g., by modifying the tinting colorants) to produce a target color produced by stored pellets. The thermoplastic composition can have a yellowness index (YI), measure in accordance with ASTM D1925-95, of less than 6 when tested with a 3.2 mm thick test sample molded at 580° F. (304° C.) with a 1.7 minute residence time. The thermoplastic composition used to form the plastic article described herein provides color properties that are surprisingly tolerant of adverse molding conditions such as longer mold retention times. In some embodiments, the b* value differs by less than 0.7, more specifically less than 0.5, if the molding residence time is changed from 1.7 minutes to 6.8 minutes.

Residence time, as used herein, is the average amount of time a thermoplastic composition spends in molten form in the heated barrel of an injection molding machine before entering a mold. Residence time can be mathematically characterized by a formula where residence time equals the cycle time used multiplied the mass or volume capacity of the barrel divided by the mass or volume capacity of the mold cavity.

The plastic article can be molded into shapes by a variety of means such as injection molding, extrusion, rotational molding, blow molding and thermoforming to form articles having a thickness of 0.5 mm to 5 mm, more specifically from 2 mm to 4 mm. Examples of articles include illumination lenses or covers for light fixtures, motor vehicle headlights, flashlights, image projector lamp lenses, as well as numerous other components for high-temperature applications. Examples of such other components include, but are not limited to windows, viewing portals, electronic device display screens and/or housings, and lenses for various applications such as image or data recording.

Examples of Embodiments

In an embodiment, a plastic article having a thickness of 0.5 mm to 5 mm, is derived from a thermoplastic composition comprising a polycarbonate, the thermoplastic composition:

1 mole % to 50 mole % of carbonate units represented by the formula (I)

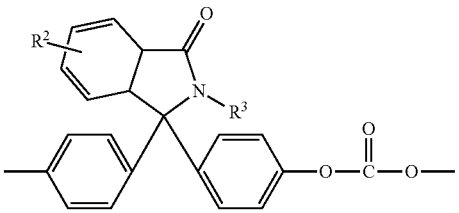

wherein $R^2$ is hydrogen, a $C_{1-25}$ hydrocarbyl group, or halogen, and $R^3$ hydrogen or a $C_{1-25}$ hydrocarbyl group;

50 mole % to 99 mole % of carbonate units represented by the formula (II)

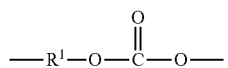

in which at least 60 percent of the total number of $R^1$ groups contain aromatic moieties and the balance thereof are aliphatic, alicyclic, or aromatic moieties, with the proviso that the carbonate units of formula (II) are not within the scope of formula (I), the mole percentages of formulas (I) and (II) based on the total number of carbonate units in the thermoplastic composition; and from 0.1 to 10 ppm by weight of phosphorous acid;
wherein the thermoplastic composition has:
a heat deflection temperature of at least 145° C. when tested in the form of a 3.2 mm thick test sample according to ASTM D648-06 under a load of 0.45 MPa;
a light transmittance of at least 85% when tested in the form of a 3.2 mm thick test sample according to ASTM D1003-00 using procedure A and CIE illuminant C and 2 degree observer on a CE7000A using an integrating sphere with 8°/diffuse geometry, specular component included, UV included, large lens, and large area view, with the percent transmittance value reported as Y (luminous transmittance) taken from the CIE 1931 tristimulus values XYZ; and
CIE1976 $L^*$, $a^*$, $b^*$ values determined according to ASTM E308-08 of $L^*$ greater than 92, $a^*$ between −1.5 and 1.5, and $b^*$ between −2.0 and 3.0, when tested in the form of a 3.2 mm thick test sample molded at 580° F. (304° C.) with a 1.7 minute residence time, using CIE illuminant C and 2 degree observer.

In the various embodiments, (i) the $b^*$ value of the thermoplastic composition differs by less than 0.7 when the molding residence time of the test sample is changed from 1.7 minutes to 6.8 minute; and/or (ii) the $b^*$ value of the thermoplastic composition differs by less than 0.5 when the molding cycle time of the test sample is changed from 1.7 minutes to 6.8 minutes; and/or (iii) $R^3$ is a $C_{6-10}$ aromatic group; and/or (iv) $R^2$ is hydrogen; and/or (iv) the units of formula (II) are derived from bisphenol A; and/or (v) the units of formula (I) are derived from 2-phenyl-3,3'-bis(4-hydroxy phenyl)phthalimidine, and the units of formula (II) are derived from bisphenol A; and/or (vi) the thermoplastic composition comprises a blend of a first polycarbonate consisting of units of formula (I) and units of formula (II) and a second polycarbonate consisting of units of formula (II); and/or (vii) the thermoplastic composition comprises a blend of a first polycarbonate comprising units of formula (I) and a second polycarbonate comprising units of formula (II); and/or (viii) the first polycarbonate comprises units of formula (I) and units of formula (II); and/or (ix) the first polycarbonate comprises from 10 mole % to 70 mole % of units of formula (I) and from 30 mole % to 90 mole % of units of formula (II), based on the total number of carbonate units in the first polymer; and/or (x) the second polycarbonate comprises 100 mole % of units of formula (II), based on the total number of carbonate units in the second polycarbonate; and/or (xi) the second polycarbonate has a weight average molecular weight of 18,000 to 32,000, as determined by gel permeation chromatography, using a crosslinked styrene-divinylbenzene column and calibrated to polycarbonate references; and/or (xii) the second polycarbonate has a weight average molecular weight of 18,000 to 20,000, as determined by gel permeation chromatography, using a crosslinked styrene-divinylbenzene column and calibrated to polycarbonate references; and/or (xiii) the thermoplastic composition comprises from 5 wt. % to 95 wt. % of the first polycarbonate and from 95 wt. % to 5 wt. % of the second polycarbonate, based on the total weight of weight of polycarbonate in the thermoplastic composition; and/or (xiv) the thermoplastic composition comprises from 3 to 5 ppm by weight of the acid additive; and/or (xv) the acid additive is phosphorous acid, hypophosphorous acid, phosphoric acid, or combinations comprising at least one of the foregoing; and/or (xvi) the acid additive is phosphorous acid; and/or (xvii) the thermoplastic composition is free of epoxy additive; and/or (xviii) the weight average molecular weight of the polycarbonate in the thermoplastic composition, as determined by gel permeation chromatography, using a crosslinked styrene-divinylbenzene column and calibrated to polycarbonate references, changes by less than 1500 Daltons from before extrusion to after extrusion at 600° F. (316° C.); and/or (xix) the thermoplastic composition has a yellowness index of less than 6 determined according to ASTM D1925-95 when tested in the form of a 3.2 mm thick test sample molded at 580° F. (304° C.) with a 1.7 minute residence time; and/or (xx) the yellowness index of the test sample changes by less than 4 when the test sample is subjected to aging at 140° C. for 1000 hours; and/or (xxi) the thermoplastic composition has a haze of less than 2% when tested in the form of a 3.2 mm thick test sample molded at 580° F. (304° C.) with a 1.7 minute residence time according to ASTM D1003-97 using CIE illuminant C; and/or (xxii) the thermoplastic composition has a notched Izod impact strength of at least 50 J/m when tested in the form of a 3.2 mm thick test sample according to ASTM D256-05 at 23° C. using a 2.27 kg weight; and/or (xxiii) the thermoplastic composition has CIE 1976 $L^*$, $a^*$, $b^*$ values determined according to ASTM E308-08 are $L^*$ greater than 94, $a^*$ between −0.72 and −0.12, and $b^*$ between 0.3 and 1.3, when tested in the form of a 3.2 mm thick test sample molded at 580° F. (304° C.) with a 1.7 minute residence time, using CIE illuminant C and 2 degree observer; and/or (xxiv) the thermoplastic composition further comprises from 0.00005 wt. % to 0.01 wt. % of a colorant, based on the weight of the thermoplastic composition; and/or (xxv) the article has a thickness of 2 mm to 4 mm; and/or (xxvi) the article is an illumination device lens; and/or (xxvii) the article is a motor vehicle headlight lens or cover.

The thermoplastic compositions are further illustrated by the following non-limiting examples.

EXAMPLES

All thermoplastic compositions except where indicated were compounded on a single screw laboratory scale extruder. All ingredients were tumble-blended prior to compound using a single feeder to the extruder. The typical sample size of the extruder is 3 kg. Compositions were compounded and extruded at a temperature of 285 to 330° C. and allowed to cool. Test samples were prepared from polymer pellets that had been subject to drying for 8 hours at 140° C. Test measurements were made using the tests and test methods described above.

Preparation 1

The following ingredients were dry blended and tumbled before being extruded as a thermoplastic composition having an MFR of 30-40 g/10 min at 330° C./2.16 kg and a weight average MW of 22,000 determined by gel permeation chromatography, using a crosslinked styrene-divinylbenzene column and calibrated to polycarbonate references:

63.58 wt. % of a co-polycarbonate containing 33 mole % PPPBP and 67 mole % BPA 35.56 wt. % of a blend of BPA homopolycarbonates
0.27 wt. % UV absorber
0.12 oxidative stabilizers
0.27 wt. % lubricant
0.20 wt. % of a 0.15% solution of phosphorous acid (3 ppm)
0.00011 wt. % Solvent Violet 36
0.000095 wt. % Pigment Blue 60

Comparative Preparation 2

A comparison material of BPA polycarbonate homopolymer having an MFR of 7-15 g/10 min at 300° C./1.2 kg] and a weight average molecular weight of 27,000 determined by gel permeation chromatography, using a crosslinked styrene-divinylbenzene column and calibrated to polycarbonate references, was used to form comparison articles.

Comparative Preparation 3

The following ingredients, representing the components of Preparation 1 without the phosphorous acid, were dry blended and tumbled before being extruded as a thermoplastic composition having an MFR of 30-40 g/10 min at 330° C./2.16 kg and a weight average MW of 22,000 determined by gel permeation chromatography, using a crosslinked styrene-divinylbenzene column and calibrated to polycarbonate references:

63.58 wt. % of a co-polycarbonate containing 33 mole % PPPBP and 67 mole % BPA
35.76 wt. % of a blend of BPA homopolycarbonates
0.27 wt. % UV absorber
0.12 oxidative stabilizers
0.27 wt. % lubricant
0.00011 wt. % Solvent Violet 36
0.000095 wt. % Pigment Blue 60

Example 1

3.2 mm thick test samples made from Preparation 1 were molded for testing as further described below. Comparison Examples 1 and 2 were prepared by molding 3.2 mm thick test samples from Comparative Preparations 1 and 2 for testing as further described below.

Experiment 1

Heat Capability Data

Test samples were measured for glass transition temperature (Tg) and heat deformation temperature (HDT) according to ASTM D648-06 under a load of 0.45 MPa. The results, set forth in Table 1, indicate a significant advantage provided by Example 1.

TABLE 1

|  | Comparative Example 2 | Comparative 3 | Example 1 |
|---|---|---|---|
| HDT @ 0.45 MPa | 135° C. | 165° C. | 165° C. |
| Tg by differential scanning calorimetry (DSC) | 148° C. | 175° C. | 175° C. |

Experiment 2

Color Stability after Oven Aging 3.2 mm test samples were placed in a 140° C. oven for 900 hours. Color measurements were taken of the samples at the times set forth in Table 2, using the ASTM methods described above. The results, set forth in Table 2, show that initial YI values were lower Example 1 than with the comparative examples, and remained lower throughout heat aging. Additionally, the level of increase in YI from aging (ΔY) was lower at each sampling stage, meaning that not only did Example start with a lower yellowing index than Comparative Example 3, but the amount by which it was lower increased with aging, meaning that it was more resistant to yellowing caused by the aging process.

TABLE 2

|  | Aging (hours) | | | | | |
|---|---|---|---|---|---|---|
|  | 0 | 200 | 400 | 550 | 750 | 920 |
| Example 1 YI | 1.6 | 2.8 | 3.4 | 3.9 | 4.5 | 5.2 |
| Example 1 ΔYI | — | 1.2 | 1.8 | 2.3 | 2.9 | 3.6 |
| Comparative Example 3 (sample 1) YI | 2.2 | 3.8 | 4.5 | 5.0 | 5.6 | 6.5 |
| Comparative Example 3 (sample 1) ΔYI | — | 1.6 | 2.3 | 2.8 | 3.4 | 4.3 |

Experiment 3

Color Stability after Oven Aging

Comparative Examples 4-6 were prepared from the formulation of Preparation 1, but replacing the phosphorous acid with 3 ppm by weight of the following comparison additives: trisnonylphenylphosphite (TNPP) (Comparative Example 4), diphenyl phosphite (Comparative Example 5), diphenyldecyl(isodecyl)phosphite (DPDP) (Comparative Example 6). The samples, along with a second sample of Example 3, were placed in a 140° C. oven for 900 hours. Color measurements were taken of the samples at the times set forth in Table 3, using the ASTM methods described above. The results, set forth in Table 3, show that initial YI values increased at an unacceptable level over the aging period.

TABLE 3

| Thermoplastic Composition | Additive | Aging (hours) | | | | | |
|---|---|---|---|---|---|---|---|
|  |  | 0 | 190 | 332 | 522 | 688 | 754 | 920 |
| Comparative Example 3 (sample 2) YI | None | 4.9 | 5.8 | 6.3 | 6.9 | 7.6 | 8.2 | 8.6 |
| Comparative Example 3 (sample 2) ΔYI | None | — | 0.9 | 1.4 | 2.0 | 2.7 | 3.2 | 3.7 |
| Comparative Example 4 YI | TNPP | 3.7 | 6.0 | 7.6 | 10.2 | 13.1 | 15.8 | 18.8 |
| Comparative Example 4 ΔYI | TNPP | — | 2.3 | 3.9 | 6.5 | 9.4 | 12.1 | 15.1 |
| Comparative Example 5 YI | Diphenyl phosphite | 3.5 | 4.1 | 4.6 | 5.4 | 6.2 | 6.8 | 7.4 |
| Comparative Example 5 ΔYI | Diphenyl phosphite | — | 0.6 | 1.1 | 1.8 | 2.6 | 3.3 | 3.8 |
| Comparative Example 6 YI | DPDP | 3.7 | 6.8 | 9.3 | 13.7 | 19.2 | 24.5 | 31.0 |
| Comparative Example 6 5 ΔYI | DPDP | — | 3.1 | 5.6 | 10.1 | 15.6 | 20.8 | 27.3 |

Experiment 4

Varying Cycle Time 3.2 mm test samples of Example 1 and test samples of Comparative Example 3 were injection molded with a flat-profile barrel temperature of 580° F. The mold temperature was 230° F. Molding was performed with cycle times of 30 seconds up to 120 seconds to model an increase in mold residence time from 1.7 minutes to 6.8 minutes. Transmittance and color measurements were taken of the samples using the methods described above. The results, set forth in Table 4, show from the delta values between the 30 second and 120 second cycle times, that the Example 1 provided a significant advantage in tolerance of adverse molding conditions. Specifically, b* increased by 0.16 and YI increased by 0.27 for Comparative Example 3, compared to a b* decrease of 0.01 and a YI decrease of 0.03 for Example 1, showing much greater color stability across a wide range of molding severity for Example 1.

TABLE 4

| Specimen | Stabilizer | Cycle Time (seconds) | YI | Transmittance (%) | L* | a* | b* |
|---|---|---|---|---|---|---|---|
| Comparative Ex. 3 | none | 30 | 2.2 | 86.0 | 94.3 | −0.598 | 1.28 |
| Comparative Ex. 3 | none | 60 | 2.2 | 86.0 | 94.3 | −0.598 | 1.28 |
| Comparative Ex. 3 | none | 90 | 2.2 | 86.0 | 94.3 | −0.598 | 1.28 |
| Comparative Ex. 3 | none | 120 | 2.2 | 86.0 | 94.3 | −0.598 | 1.28 |
| Comp. Ex. 3 Δ (30 sec → 120 sec) | | | 0.27 | −0.02 | −0.01 | −0.06 | 0.16 |
| Example 1 | 3 ppm $H_3PO_3$ | 30 | 2.0 | 86.2 | 94.4 | −0.564 | 1.12 |
| Example 1 | 3 ppm $H_3PO_3$ | 60 | 1.7 | 86.3 | 94.4 | −0.528 | 0.98 |
| Example 1 | 3 ppm $H_3PO_3$ | 90 | 1.8 | 86.2 | 94.4 | −0.550 | 1.02 |
| Example 1 | 3 ppm $H_3PO_3$ | 120 | 1.9 | 86.2 | 94.4 | −0.582 | 1.11 |
| Example 1 Δ (30 sec → 120 sec) | | | −0.03 | 0.03 | 0.01 | −0.02 | −0.01 |

Experiment 5

Varying Cycle Time 3.2 mm test samples of Example 1 and Comparative Example 3 were injection molded with a flat-profile barrel temperature of 600° F. The mold temperature was 230° F. Molding was performed with cycle times of 30 seconds up to 120 seconds, resulting in an increase in mold residence time from 1.7 minutes to 6.8 minutes. Transmittance and color measurements were taken of the samples ASTM methods described above. The results, set forth in Table 5, show from the delta values between the 30 second and 120 second cycle times, that the Example 1 provided a significant advantage in tolerance of adverse molding conditions. Specifically, b* increased by 0.32 and YI increased by 0.55 for Comparative Example 3, compared to a b* increase of only 0.14 and a YI increase of only 0.24 for Example 1, showing much greater color stability across a wide range of molding severity for Example 1.

TABLE 5

| Specimen | Stabilizer | Cycle Time (seconds) | YI | Transmittance (%) | L* | a* | b* |
|---|---|---|---|---|---|---|---|
| Comparative Ex. 3 | none | 30 | 2.3 | 85.9 | 94.3 | −0.622 | 1.34 |
| Comparative Ex. 3 | none | 60 | 2.4 | 86.0 | 94.3 | −0.638 | 1.37 |
| Comparative Ex. 3 | none | 90 | 2.7 | 85.9 | 94.3 | −0.692 | 1.53 |
| Comparative Ex. 3 | none | 120 | 2.9 | 85.9 | 94.3 | −0.728 | 1.66 |
| Comp. Ex. 3 Δ (30 sec → 120 sec) | | | 0.55 | −0.06 | −0.01 | −0.11 | 0.16 |
| Example 1 | 3 ppm $H_3PO_3$ | 30 | 1.8 | 86.2 | 94.4 | −0.555 | 1.04 |

TABLE 5-continued

| Specimen | Stabilizer | Cycle Time (seconds) | YI | Transmittance (%) | L* | a* | b* |
|---|---|---|---|---|---|---|---|
| Example 1 | 3 ppm H$_3$PO$_3$ | 60 | 1.9 | 86.2 | 94.4 | −0.568 | 1.07 |
| Example 1 | 3 ppm H$_3$PO$_3$ | 90 | 2.0 | 86.2 | 94.4 | −0.593 | 1.14 |
| Example 1 | 3 ppm H$_3$PO$_3$ | 120 | 2.1 | 86.1 | 94.4 | −0.608 | 1.19 |
| Example 1 Δ (30 sec → 120 sec) | | | 0.24 | −0.05 | −0.02 | −0.05 | 0.14 |

Experiment 6

Varying Cycle Time 3.2 mm test samples of Example 1 and Comparative Example 3 were prepared by injection molding with a flat-profile barrel temperature of 620° F. The mold temperature was 230° F. Molding was performed with cycle times of 30 seconds up to 120 seconds to model an increase in mold residence time from 1.7 minutes to 6.8 minutes. Transmittance and color measurements were taken of the samples ASTM methods described above. The results, set forth in Table 5, show from the delta values between the 30 second and 120 second cycle times, that the Example 1 provided a significant advantage in tolerance of adverse molding conditions. Specifically, b* increased by 0.73 and YI increased by 1.24 for Comparative Example 3, compared to a b* increase of only 0.56 and a YI increase of only 0.94 for Example 1, showing much greater color stability across a wide range of molding severity for Example 1.

TABLE 6

| Specimen | Stabilizer | Cycle Time (seconds) | YI | Transmittance (%) | L* | a* | b* |
|---|---|---|---|---|---|---|---|
| Comparative Ex. 3 | none | 30 | 2.4 | 86.0 | 94.3 | −0.635 | 1.38 |
| Comparative Ex. 3 | none | 60 | 2.6 | 86.0 | 94.3 | −0.666 | 1.48 |
| Comparative Ex. 3 | none | 90 | 3.1 | 85.9 | 94.3 | −0.751 | 1.77 |
| Comparative Ex. 3 | none | 120 | 3.6 | 85.8 | 94.2 | −0.863 | 2.11 |
| Comp. Ex. 3 Δ (30 sec → 120 sec) | | | 1.24 | −0.27 | −0.11 | −0.23 | 0.73 |
| Example 1 | 3 ppm H$_3$PO$_3$ | 30 | 1.8 | 86.2 | 94.4 | −0.544 | 1.05 |
| Example 1 | 3 ppm H$_3$PO$_3$ | 60 | 2.0 | 86.2 | 94.4 | −0.578 | 1.14 |
| Example 1 | 3 ppm H$_3$PO$_3$ | 90 | 2.4 | 86.1 | 94.4 | −0.660 | 1.39 |
| Example 1 | 3 ppm H$_3$PO$_3$ | 120 | 2.8 | 86.1 | 94.3 | −0.730 | 1.61 |
| Example 1 Δ (30 sec → 120 sec) | | | 0.94 | −0.17 | −0.07 | −0.19 | 0.56 |

Experiment 7

Molecular Weight Change

Preparation 2 was prepared in the same fashion as Preparation 1, except that it utilized 5 ppm by weight of phosphorous acid. Preparation 3 was prepared in the same fashion as Preparation 2, with the addition of 300 ppm by weight of a commercially available epoxy additive ERL-4221. Comparative Preparation 4 was prepared in the same fashion as Comparative Preparation 3, with the addition of 300 ppm by weight of a commercially available epoxy additive ERL-4221. The materials were tested for molecular weight change observed from before extrusion to after extrusion at 600° F. Samples were screened having no additive (Comparative Preparation 3), phosphorous acid only (Preparation 2), epoxy additive only (Comparative Preparation 4), and phosphorous acid and epoxy additives Preparation 3), with molecular weight being determined as weight average molecular weight as determined by gel permeation chromatography, using a crosslinked styrene-divinylbenzene column and calibrated to polycarbonate references. The results, set forth in Table 7, surprisingly show that the epoxy additive had an adverse impact on molecular weight stability.

TABLE 7

| Material | Preparation 1 | Comparative Preparation 3 | Comparative Preparation 4 | Preparation 2 |
|---|---|---|---|---|
| MW before extrusion (g/mol) | 25,274 | 25,274 | 25,274 | 25,274 |
| MW after extrusion (g/mol) | 24,875 | 24,628 | 24,776 | 24,749 |
| % Δ in MW from before extrusion to after extrusion | −1.6 | −2.6 | −2.0 | −2.1 |

The singular forms "a," "an," and "the" include plural referents unless the context clearly dictates otherwise. "Or" means "and/or". The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). The suffix "(s)" is intended to include both the singular and the plural of the term that it modifies, thereby including at least one of that term (e.g., "the colorant(s)" includes at least one colorant and also more than one colorant). "Optional" or "optionally" means that the subsequently described event or circumstance can or can not occur, and that the description includes instances where the event occurs and instances where it does not.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxy groups; C6-10 aryloxy such as phenoxy; C1-6 alkylthio; C1-6 or C1-3 alkylsulfinyl; C1-6 or C1-3 alkylsulfonyl; aminodi (C1-6 or C1-3)alkyl; C6-12 aryl having at least one aromatic rings (e.g., phenyl, biphenyl, naphthyl, or the like, each ring either substituted or unsubstituted aromatic); C7-19 alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A plastic article having a thickness of 0.5 mm to 5 mm, derived from a thermoplastic composition comprising a polycarbonate, said thermoplastic composition comprising:

1 mole % to 50 mole % of carbonate units represented by the formula (I)

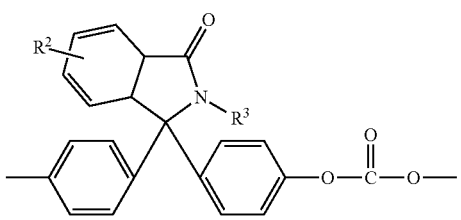

wherein $R^2$ is hydrogen, a $C_{1-25}$ hydrocarbyl group, or halogen, and $R^3$ hydrogen or a $C_{1-25}$ hydrocarbyl group;

50 mole % to 99 mole % of carbonate units represented by the formula (II)

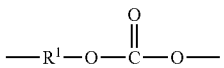

in which at least 60 percent of the total number of $R^1$ groups contain aromatic moieties and the balance thereof are aliphatic, alicyclic, or aromatic moieties, with the proviso that the carbonate units of formula (II) are not within the scope of formula (I), the mole percentages of formulas (I) and (II) based on the total number of carbonate units in the thermoplastic composition; and from 0.1 to 10 ppm by weight of an acid additive;

wherein the thermoplastic composition has:

a heat deflection temperature of at least 145° C. when tested in the form of a 3.2 mm thick test sample according to ASTM D648-06 under a load of 0.45 MPa;

a light transmittance of at least 85% when tested in the form of a 3.2 mm thick test sample according to ASTM D1003-00 using procedure A and CIE illuminant C and 2 degree observer on a CE7000A using an integrating sphere with 8°/diffuse geometry, specular component included, UV included, large lens, and large area view, with the percent transmittance value reported as Y (luminous transmittance) taken from the CIE 1931 tristimulus values XYZ; and CIE1976 L*, a*, b* values determined according to ASTM E308-08 of L* greater than 92, a* between −1.5 and 1.5, and b* between −2.0 and 3.0, when tested in the form of a 3.2 mm thick test sample molded at 580° F. (304° C.) with a 1.7 minute residence time, using CIE illuminant C and 2 degree observer.

2. The article of claim 1, wherein $R^3$ is a $C_{6-10}$ aromatic group.

3. The article of claim 1, wherein $R^2$ is hydrogen.

4. The article of claim 1, wherein the units of formula (II) are derived from bisphenol A.

5. The article of claim 1, wherein the units of formula (I) are derived from 2-phenyl-3,3'-bis(4-hydroxy phenyl) phthalimidine, and the units of formula (II) are derived from bisphenol A.

6. The article of claim 1, wherein the thermoplastic composition comprises from 3 to 5 ppm by weight of the acid additive.

7. The article of claim 1, wherein the acid additive is phosphorous acid, hypophosphorous acid, phosphoric acid, or combinations comprising at least one of the foregoing.

8. The article of claim 1, wherein the thermoplastic composition is free of epoxy additive.

9. The article claim 1, wherein the weight average molecular weight of the polycarbonate in the thermoplastic composition, as determined by gel permeation chromatography, using a crosslinked styrene-divinylbenzene column and calibrated to polycarbonate references, changes by less than 1500 Daltons from before extrusion to after extrusion at 600° F. (316° C.).

10. The article of claim 1, wherein the thermoplastic composition further comprises from 0.00005 wt. % to 0.01 wt. % of a colorant, based on the weight of the thermoplastic composition.

11. The article of claim 1, having a thickness of 2 mm to 4 mm.

12. The article of claim 1, wherein the b* value of the thermoplastic composition differs by less than 0.7 when the molding residence time of the test sample is changed from 1.7 minutes to 6.8 minutes.

13. The article of claim 12, wherein the b* value of the thermoplastic composition differs by less than 0.5 when the molding cycle time of the test sample is changed from 1.7 minutes to 6.8 minutes.

14. The article of claim 1, wherein the thermoplastic composition comprises a blend of a first polycarbonate comprising units of formula (I) and a second polycarbonate comprising units of formula (II).

15. The article of claim 14, wherein the second polycarbonate comprises 100 mole % of units of formula (II), based on the total number of carbonate units in the second polycarbonate.

16. The article of claim 14, wherein the thermoplastic composition comprises from 5 wt. % to 95 wt. % of the first polycarbonate and from 95 wt. % to 5 wt. % of the second polycarbonate, based on the total weight of weight of polycarbonate in the thermoplastic composition.

17. The article of claim 14, wherein the first polycarbonate comprises units of formula (I) and units of formula (II).

18. The article of claim 17, wherein the first polycarbonate comprises from 10 mole % to 70 mole % of units of formula (I), and from 30 mole % to 90 mole % of units of formula (II), based on the total number of carbonate units in the first polycarbonate.

19. The article of claim 1, that is an illumination device lens.

20. The article of claim 19 that is a motor vehicle headlight lens or cover.

* * * * *